(12) United States Patent
Frenken

(10) Patent No.: US 9,561,535 B2
(45) Date of Patent: Feb. 7, 2017

(54) METHOD FOR MILLING A CUTOUT IN A WORKPIECE, AND WORKPIECE HAVING A CUTOUT

(75) Inventor: Egbert Frenken, Heinsberg (DE)

(73) Assignee: Gustav Klauke GmbH (DE)

( * ) Notice: Subject to any disclaimer, the term of this patent is extended or adjusted under 35 U.S.C. 154(b) by 591 days.

(21) Appl. No.: 13/880,307

(22) PCT Filed: Dec. 14, 2011

(86) PCT No.: PCT/EP2011/072686
§ 371 (c)(1),
(2), (4) Date: Mar. 31, 2014

(87) PCT Pub. No.: WO2012/080293
PCT Pub. Date: Jun. 21, 2012

(65) Prior Publication Data
US 2014/0202299 A1 Jul. 24, 2014

(30) Foreign Application Priority Data
Dec. 17, 2010 (DE) .................. 10 2010 061 321

(51) Int. Cl.
*B21D 37/20* (2006.01)
*B23C 3/00* (2006.01)
*B26F 1/44* (2006.01)

(52) U.S. Cl.
CPC ............... *B21D 37/205* (2013.01); *B23C 3/00* (2013.01); *B26F 1/44* (2013.01); *Y10T 83/9437* (2015.04); *Y10T 409/303752* (2015.01)

(58) Field of Classification Search
CPC ............ B23C 3/00; B26F 1/44; B21D 37/205; Y10T 409/303752; Y10T 83/9437
USPC ...... 83/13, 648, 690; 409/103, 131, 84, 191, 409/132, 136, 234, 180, 54, 217; 407/54; 408/59; 82/1.11, 1.3, 1.4, 118, 11.3, 142
See application file for complete search history.

(56) References Cited

U.S. PATENT DOCUMENTS

| | | | | |
|---|---|---|---|---|
| 3,250,154 A | * | 5/1966 | Breuning | .............. B23B 27/007 408/199 |
| 3,494,033 A | | 2/1970 | Bosco et al. | |
| 3,811,163 A | * | 5/1974 | Frederick | ............ B23B 51/0406 175/412 |

(Continued)

FOREIGN PATENT DOCUMENTS

| | | |
|---|---|---|
| DE | 3915393 U1 | 3/1994 |
| DE | 9315392 U1 | 1/1995 |

(Continued)

OTHER PUBLICATIONS

International Search Report from PCT/EP11/72686.

*Primary Examiner* — Ghassem Alie
(74) *Attorney, Agent, or Firm* — Klintworth & Rozenblat IP LLC

(57) ABSTRACT

A method for milling a cutout using a milling cutter in a workpiece is provided. A longitudinal axis of the milling cutter is positioned in a first orientation relative to the workpiece to contact a first side of the workpiece. An enveloping cylindrical surface of the milling cutter is then used to cut a cutout which has a plurality of peripheral edges and rounded corners. The milling cutter is then placed in a second orientation which is angled relative to the first orientation. Thereafter, the enveloping cylindrical surface and an enveloping axial surface of the milling cutter are used to further cut the rounded corners of the cutout to form sharp corners.

18 Claims, 12 Drawing Sheets

(56) References Cited

U.S. PATENT DOCUMENTS

| | | | |
|---|---|---|---|
| 4,648,761 A | 3/1987 | Mitchell | |
| 4,850,761 A * | 7/1989 | Breuer | B23C 3/00 |
| | | | 409/132 |
| 6,311,597 B1 | 11/2001 | Schroth | |
| 6,601,484 B1 * | 8/2003 | Katoh | B23B 41/04 |
| | | | 409/132 |
| 6,840,721 B2 * | 1/2005 | Kaule | B41C 1/04 |
| | | | 101/150 |
| 2002/0071732 A1 | 6/2002 | Funaki | |
| 2004/0042860 A1 * | 3/2004 | Ranganath | G05B 19/4069 |
| | | | 409/84 |
| 2007/0014644 A1 * | 1/2007 | Masuyama | B23C 3/26 |
| | | | 409/132 |
| 2007/0189869 A1 * | 8/2007 | Harif | B23C 5/10 |
| | | | 409/234 |
| 2010/0095815 A1 | 4/2010 | Laib | |
| 2013/0272813 A1 * | 10/2013 | Bichsel | B23C 1/12 |
| | | | 409/132 |

FOREIGN PATENT DOCUMENTS

| | | | | |
|---|---|---|---|---|
| EP | 1661651 A1 | 5/2006 | | |
| JP | 63156604 | * | 6/1988 | B23C 3/00 |
| JP | H09117845 A | 5/1997 | | |
| JP | 2004202688 A | 7/2004 | | |
| JP | 2005305595 A | 11/2005 | | |

* cited by examiner

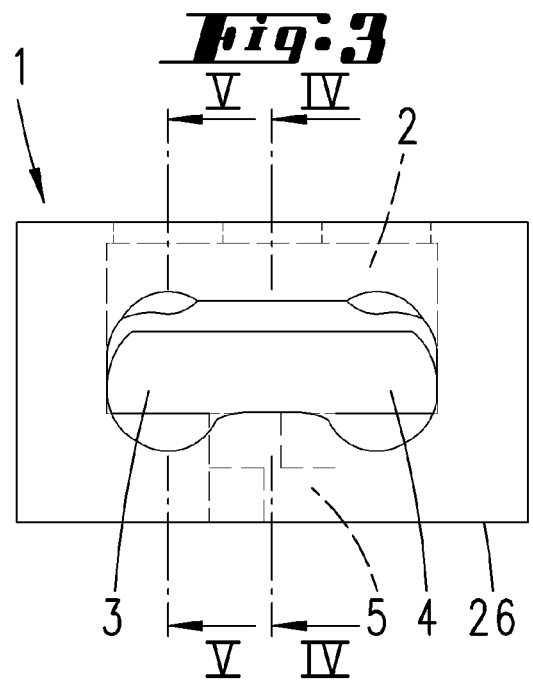
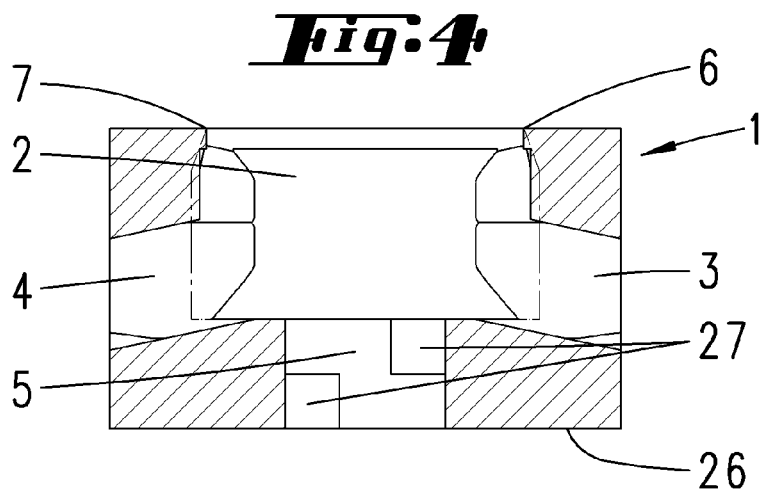
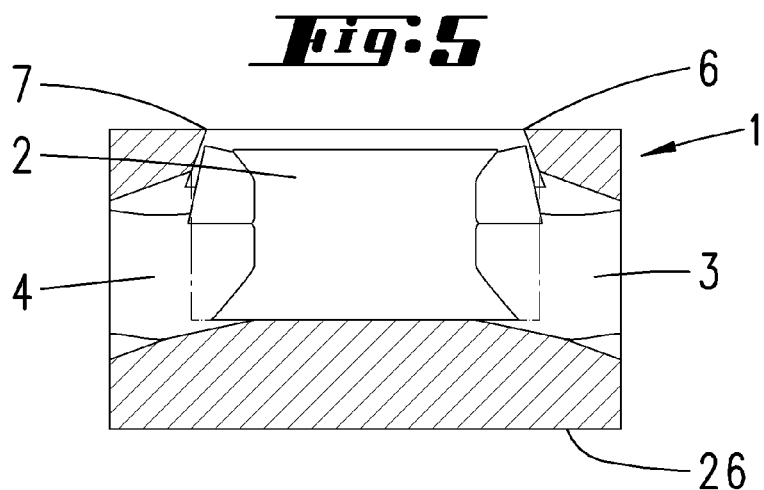

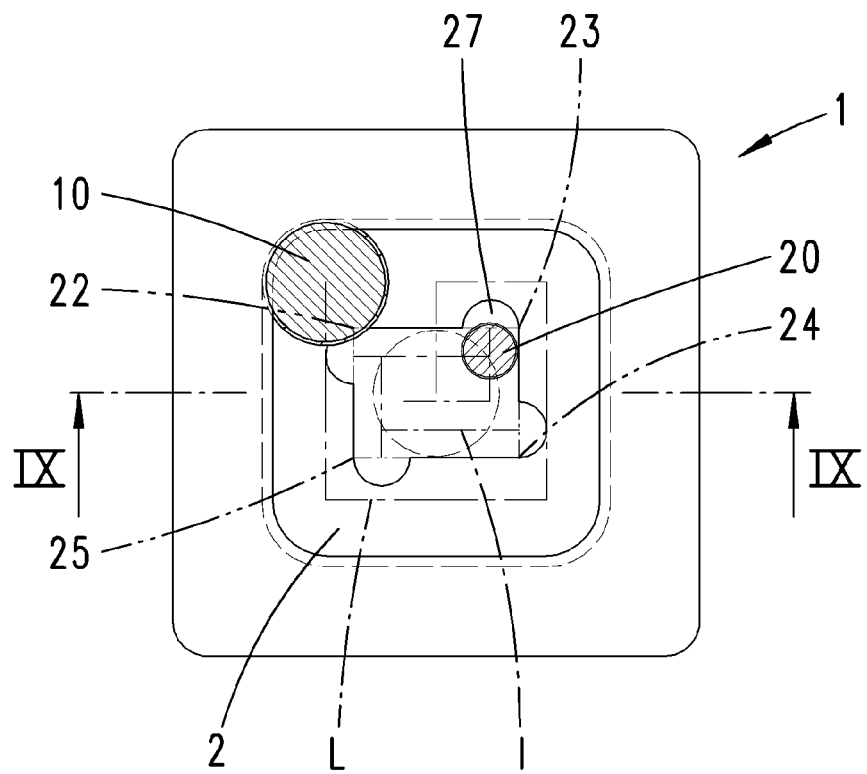
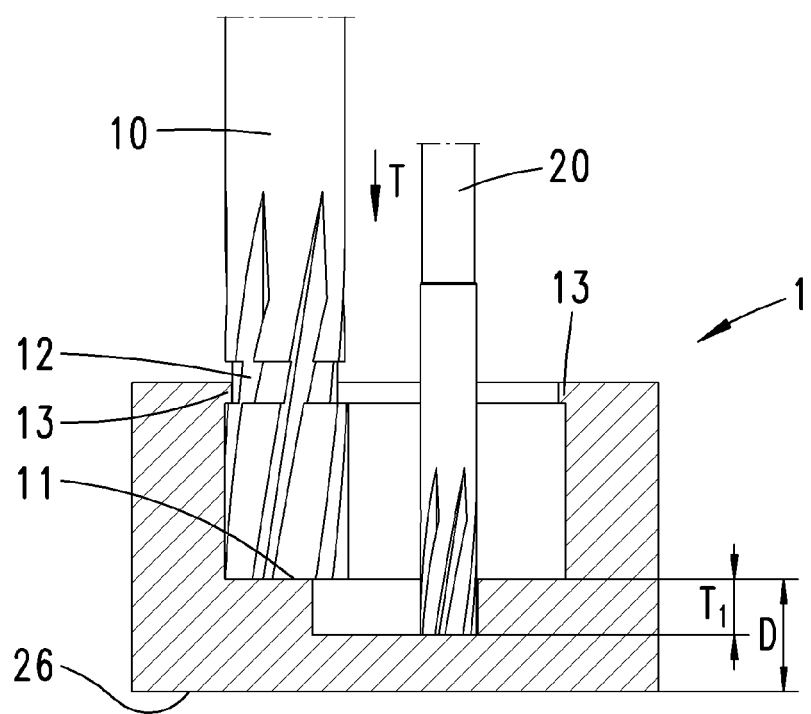

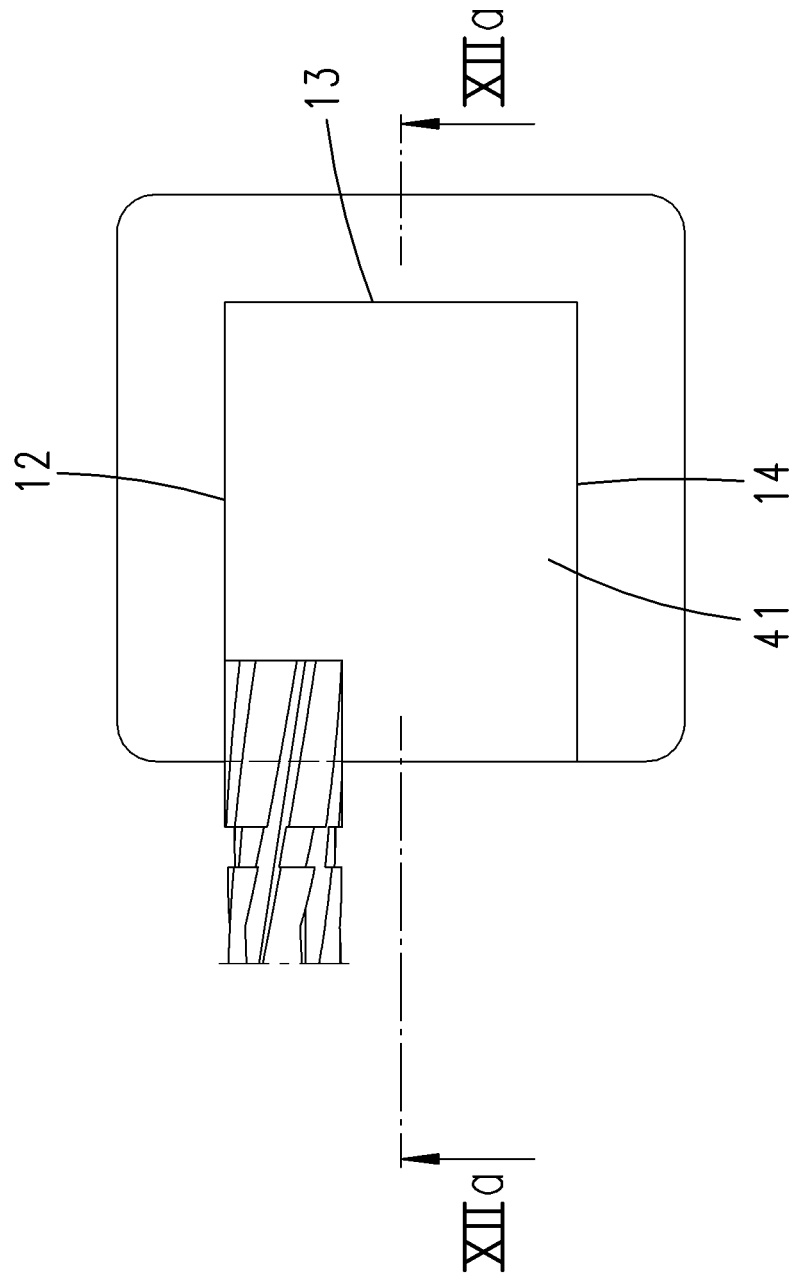

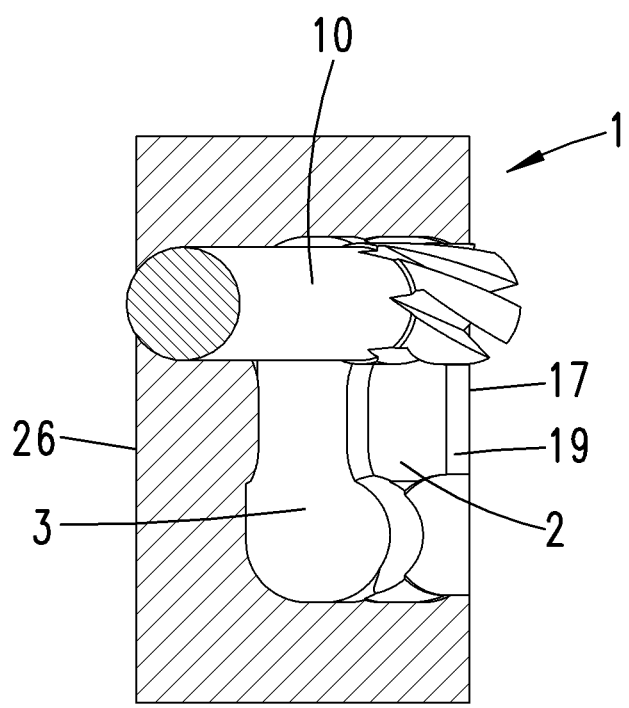

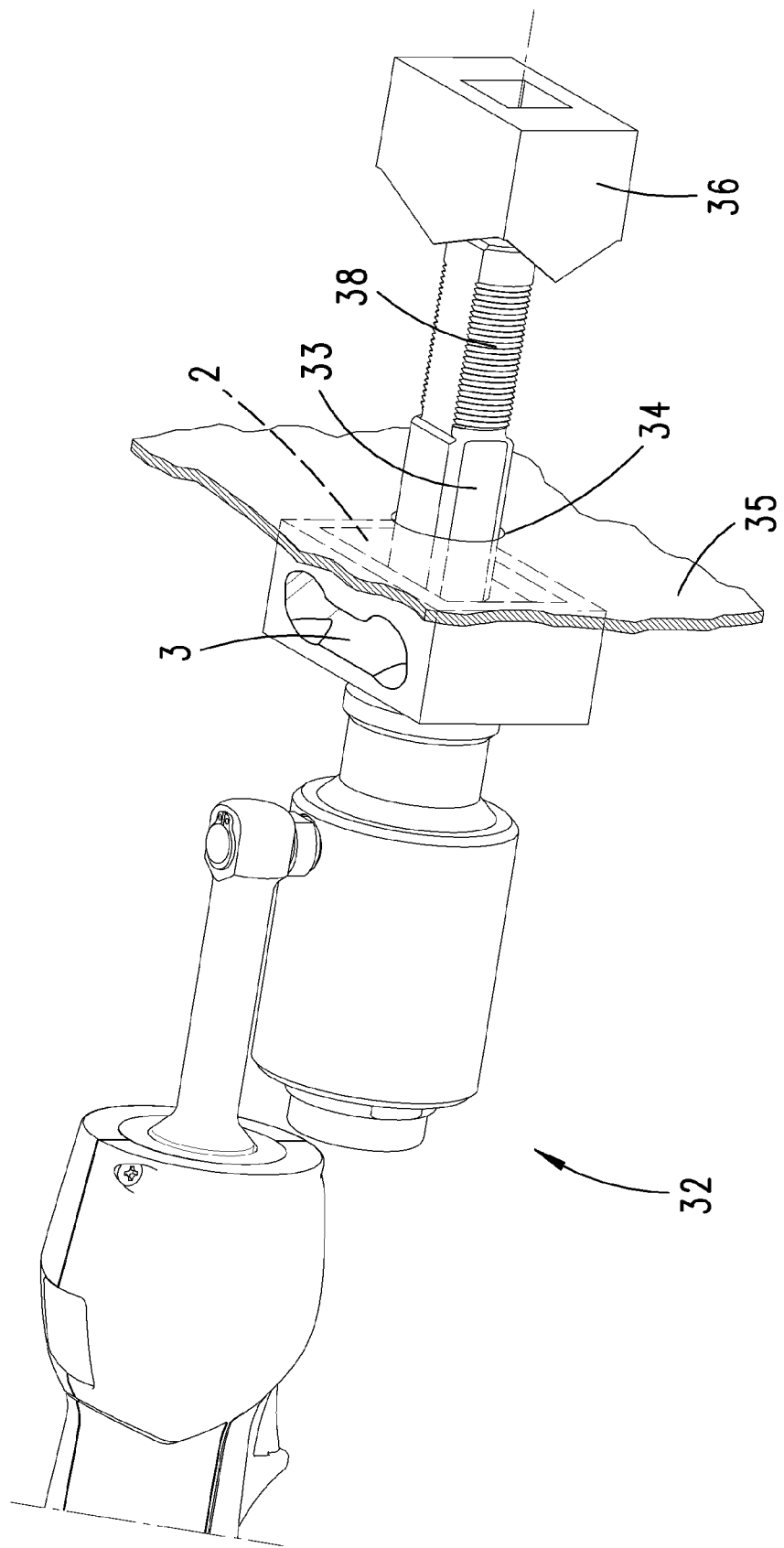

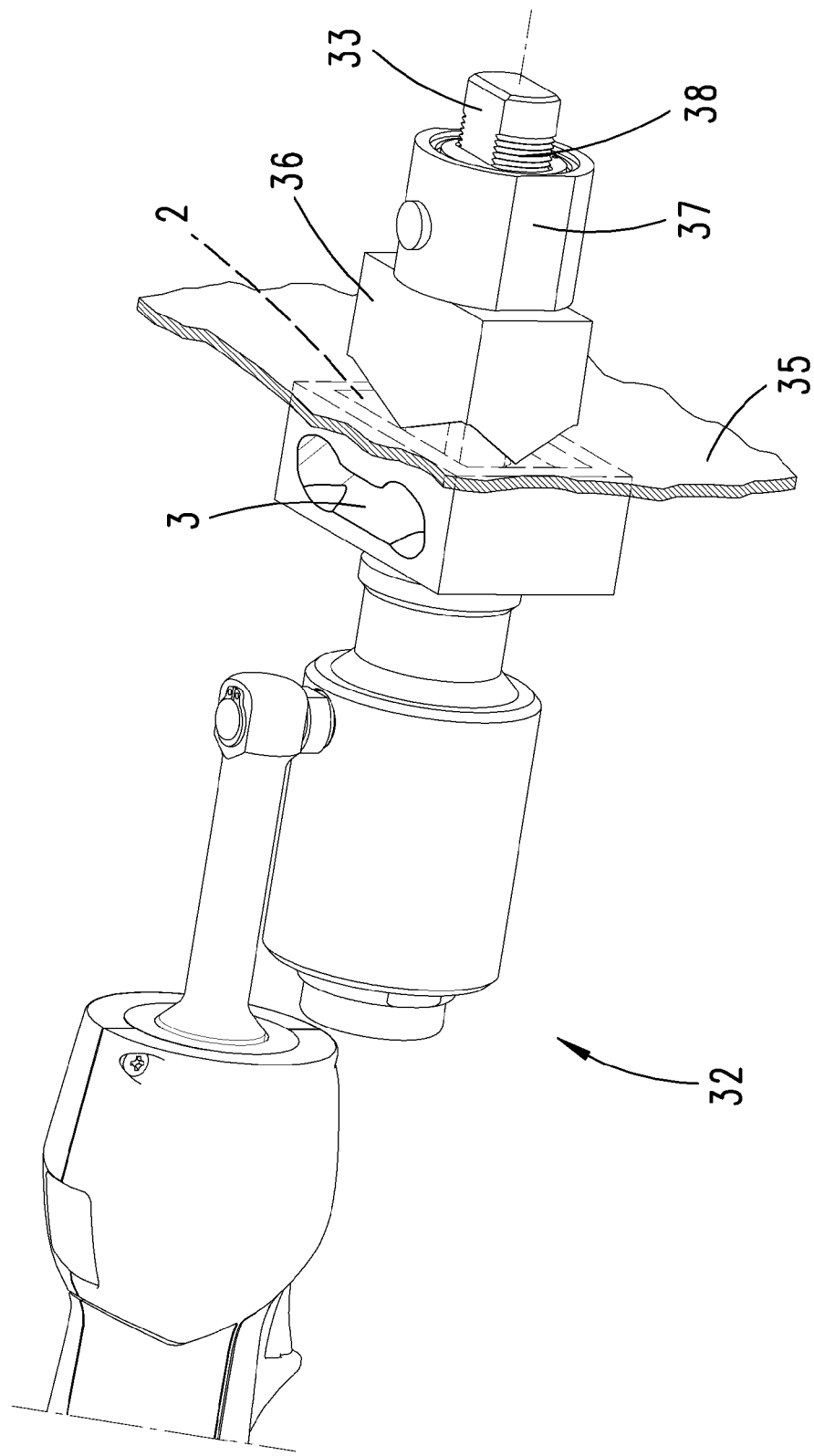

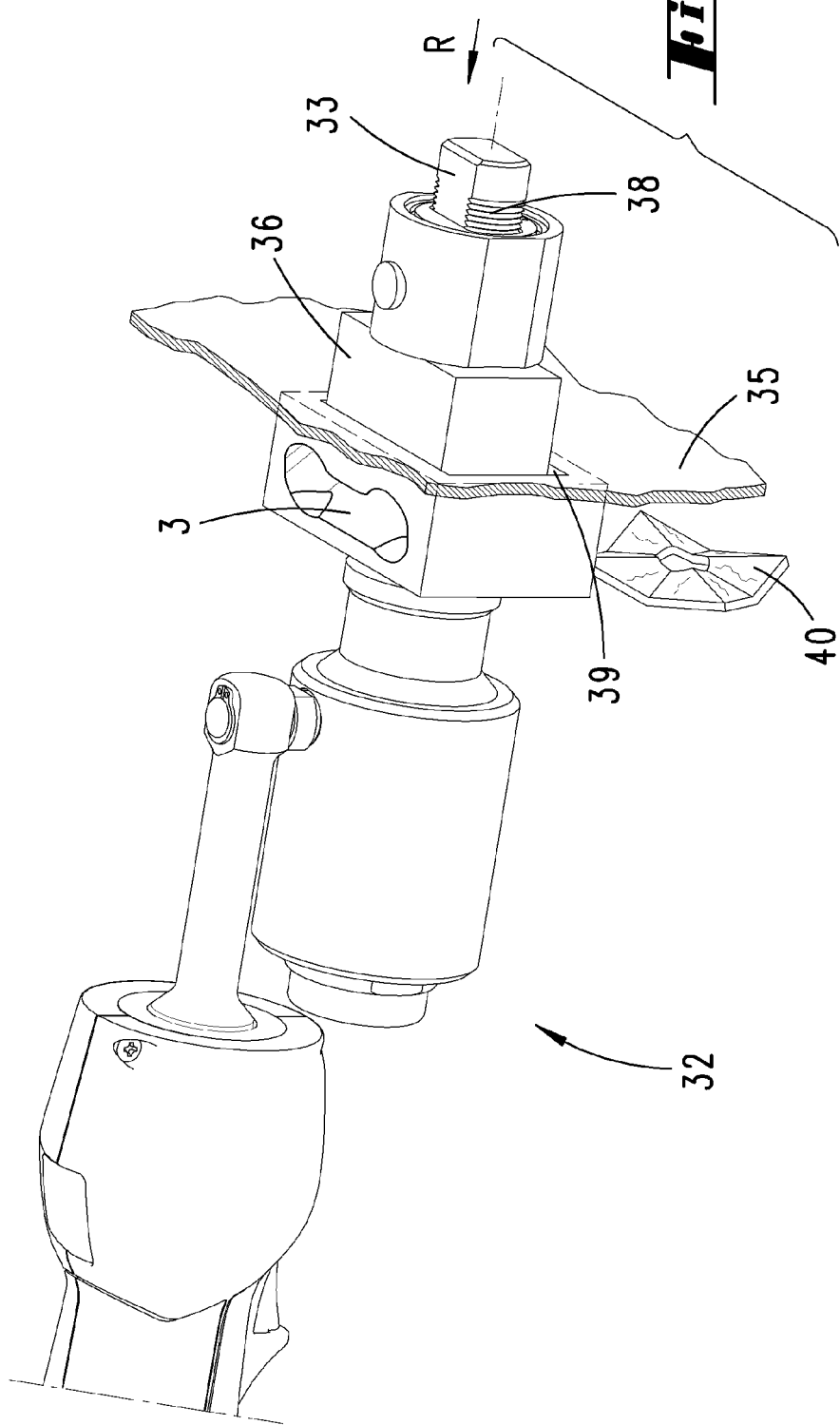

METHOD FOR MILLING A CUTOUT IN A WORKPIECE, AND WORKPIECE HAVING A CUTOUT

FIELD OF THE INVENTION

The invention relates, in first instance, to a method for milling a cutout in a workpiece, the cutout having peripheral edge portions in a corner region that meet one another at an angle, and the cutout being formed using a milling cutter which during operation occupies an enveloping surface, for example a cylindrical surface, and has a lateral face and an end face, the corner region being initially formed in a first orientation of the milling cutter which preferably corresponds to a longitudinal axis of the cutout, by use of the portion of the milling cutter that generates the lateral face.

BACKGROUND OF THE INVENTION

In the milling of cutouts, it is known to form cutouts in a workpiece using a milling cutter which, as stated, generates a lateral face, for example a cylindrical lateral face, during operation. A corner region may only be formed which corresponds to a cross-sectional curvature of the, for example cylindrical, surface. Achieving a sharper corner shape requires subsequent machining, for example by grinding or reaming.

It is known from US 2002/0071732 A1 to form relatively sharp-edged corners by means of a rotating milling cutter, in that a milling cutter which is multi-edged in plan view is moved relative to a workpiece in a plane parallel to a base surface of the tool in such a way that an outer end of a cutting edge of the rotating tool describes a displacement path that conforms to a desired corner shape in a cutout in the workpiece. This method requires a relatively complicated machine tool on account of the displacement motion between the tool and the workpiece, which is necessary at the same time as the rotation of the tool.

There is a need to produce, as efficiently as possible, also cutouts in workpieces which have a sharp corner shape, i.e., in particular by means of a milling cutter, also preferably using known machining centers, universal machines, or multispindle automatic milling machines.

One application for these types of milled cutouts is in hole punches, for example. In this regard, reference may be made to DE 9315 393 U1 and DE 93 15 392 U1, for example. Forming rectangular holes requires rectangular hole punches, which during punching move into a die having a corresponding rectangular cutout. Such a punch having a rectangular cross-section together with a corresponding die is also known from U.S. Pat. No. 3,494,033.

SUMMARY OF THE INVENTION

Based on the cited prior art, it is an object of the invention to provide a method for milling a cutout in a workpiece, by means of which corners having the sharpest edges possible may also be formed, and in addition to provide this type of workpiece.

One possible approach to achieving the object is provided according to a first inventive concept, by means of a method in which in a second orientation of the milling cutter, optionally while forming a bevel which on a peripheral edge portion is oriented transversely with respect to the direction of extent thereof, a corner shape that corresponds to the transition of the end face to the lateral face is formed between the mutually meeting peripheral edge portions, using the portion of the milling cutter, i.e., the front side, that creates the end face of the enveloping surface. By using both portions of the enveloping surface, i.e., the end face as well as the lateral face, to form the peripheral edge, in first instance material may be removed to a great extent, also in the customary orientation of the milling cutter, using essentially the lateral face, whereby in this orientation the end face may also be used for deepening the cutout, optionally to the extent that only the corner regions require further machining, using the portion of the milling cutter that creates the end face, in order to achieve the mentioned corner shape at that location. By means of the mentioned front side, preferably also the front side of the end face of the enveloping surface generated by the same milling cutter, the corner shaping may then be carried out according to the angle formed between the end face and the lateral face. In particular when the cutout is formed with a closed peripheral edge, it is possible to create the corner shape while forming a bevel which on a peripheral edge portion is oriented transversely with respect to the direction of extent thereof. This is suitable when this machining is carried out in the appropriate orientation of the milling cutter, for example obliquely from below, through a window of the workpiece, for example, or when the workpiece has only a small thickness. The bevel may also be created when the corner shaping is carried out from the side, from above, or on the outside with respect to the cutout from which the first milling cut has been made.

Another possible approach to achieving the object is provided in a method in which the corner region is formed by the milling cutters being driven so that their paths cross, using milling cutters which are directed oppositely to one another with respect to a depth direction of the hole, a cutting away being carried out in each case only over a portion of the depth of the cutout, but with a depthwise overlap of the cutaway areas. In this way, a desired sharp edge may be formed at a corner region of the cutout, in projection of the peripheral edges created by the milling cutters. The cutout is specifically a through opening. The milling cutters are also preferably oriented parallel one another, in opposite directions; i.e., they are aligned and moved in such a way that their longitudinal axes extend parallel to one another. This does not mean that they must be used at the same time, although they may be so used. However, they may also be oriented in nonalignment with one another, in particular when a bevel of the peripheral edge is also to be achieved during such an operation.

One or both milling cutters move(s) inside the hole with respect to the peripheral edge. The milling cutters in each case travel past the corner region, in projection, which is then reached. It is particularly preferred that the milling cutters travel past the corner region in only one orientation in the mentioned direction of the milling cutters. With regard to the same corner region, the milling cutter travels beyond this corner region in the other orientation and in the other direction, along the further peripheral edge forming this corner region. Thus, the cutaway areas, i.e., the over-run regions, achieved by such traveling out beyond the corner do not accordingly result in a portion of the through opening, but, rather, resemble blind holes.

The subject matter of the invention further concerns a workpiece, in particular a die for a sheet metal punch, having a cutout which has a peripheral edge, preferably a cutout which has peripheral edges formed corresponding to a rectangle, which meet one another in corner regions, a corner region being milled which has a deviation from a geometric sharp edge of preferably less than one millimeter.

With regard to the prior art described at the outset, it is an object of the invention to provide a workpiece which is manufacturable in an efficient manner.

This object is achieved for a workpiece in which the workpiece is formed with an opening opposite from the peripheral edge, beneath a surface that has the peripheral edge.

In a first embodiment, this is provided by an opening which has peripheral edges extending in a U shape, for example. The mentioned opening results opposite from the U-shaped web, since, due to the depth of the cutout, a milling cutter, preferably with its end face optionally extending perpendicularly with respect to its longitudinal axis, is then able to move into the opening perpendicularly with respect to the plane containing the cutout, for forming the corner. This is based on a case in which, as preferred, the peripheral edge as a whole extends completely in a single plane.

In addition, the opening situated opposite from the peripheral edge may also be provided by an opening which with respect to the peripheral edge is formed in an offset manner in a direction perpendicular to the plane. This is the case in particular when the workpiece has one or more windows. These types of windows are openings which originate from an outer surface of the workpiece which from a geometric standpoint forms a cut edge with the surface having the cutout. For a rectangular or square workpiece, these may be flat surfaces which intersect at a right angle. However, they may also be spherical surfaces, or surfaces which intersect at an acute or obtuse angle. The mentioned surfaces also do not have to meet one another at a shared peripheral edge, and may merely intersect at an imaginary geometric extension.

Also corresponding to the described procedure according to the method, the mentioned deviation from the sharp edges of the corner shape depends on the particular geometry of the transition of the enveloping surface from the end face to the lateral face.

It is apparent that the mentioned workpiece may be efficiently manufactured by milling, essentially using the same milling cutter and two milling cutters which are optionally the same. The cutouts in general, as well as the corner regions of the cutouts, can be produced by milling only.

The described first and second orientation of the milling cutter, or the drive of the milling cutters so that their paths cross, with the milling cutters being directed opposite to one another, may be carried out in each case using the same milling cutter in a sequence of steps, as well as also using different milling cutters which, in particular in the case of a multispindle automatic milling machine, are guided in a suitable sequence, whereby synchronism may be provided, at least in part, for machining the workpiece.

It is also preferred that two openings are formed on a workpiece using different milling processes, in particular using milling processes as described above. In this regard, a cutout may have one or more, preferably two, peripheral edges which have the mentioned bevel. The other opening may have peripheral edges which complement one another only in projection to form a sharp-edged peripheral edge.

If it is also preferred that peripheral edges extending in a straight line are involved, it is apparent that the described procedure may also be used to produce a cutout in which one or more peripheral edges are curved.

The invention is explained in greater detail below with reference to the appended drawings, which however illustrate only an exemplary embodiment. The drawings show the following:

BRIEF DESCRIPTION OF THE DRAWINGS

FIG. 3 shows a side view of the item according to FIG. 1, viewed in the direction of the arrow P in FIG. 1;

FIG. 4 shows a cross-section through the item according to FIG. 1 and FIG. 3, sectioned along the line IV-IV in FIG. 1 [sic; 3];

FIG. 5 shows an illustration corresponding to FIG. 4, sectioned along the line V-V in FIG. 3;

FIG. 8 shows a top view of the arrangement according to FIG. 7, with an illustration of the travel paths of the milling cutters;

FIG. 9 shows a cross-section through the arrangement according to FIG. 8, sectioned along the line IX-IX;

FIG. 11a shows an illustration corresponding to FIG. 11, with a U-shaped formation of the cutout;

FIG. 12a shows a cross-section through the arrangement according to FIG. 11a, sectioned along the line XIIa-XIIa in FIG. 11a;

FIG. 13 shows a cross-section through the arrangement according to FIG. 12, sectioned along the line XIII-XIII;

FIG. 15 shows a (partial) perspective view of a manual pressing device having a punch attachment, with the punch situated at a distance from the sheet metal to be punched, for purposes of illustration;

FIG. 16 shows an illustration corresponding to FIG. 15, with the punch resting on the sheet metal; and FIG. 17 shows an illustration after completion of punching, with a punched piece that has fallen out.

DETAILED DESCRIPTION OF THE ILLUSTRATED EMBODIMENTS

Figure 1:
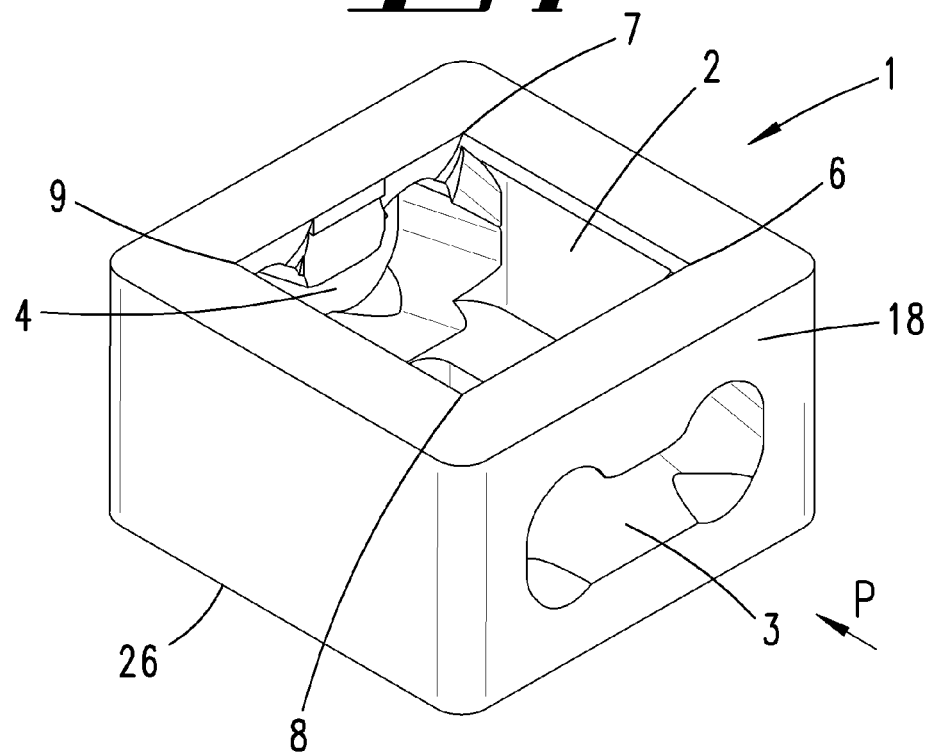
FIG. 1 shows a perspective view of a workpiece formed as a die for a sheet metal punch.
Figure 2:
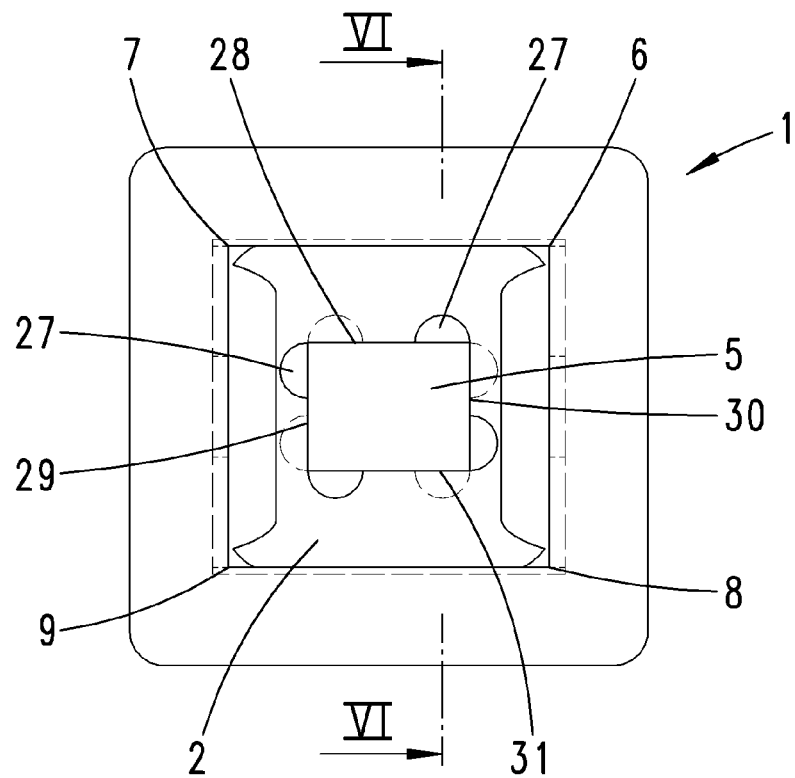
FIG. 2 shows a top view of the item according to FIG. 1.

A workpiece 1 which is formed here as a die of a sheet metal punching tool is illustrated and described (see in particular FIGS. 1 to 3). In the present context this is preferably a steel part.

The workpiece 1 has an upper cutout 2, two lateral windows 3, 4 (also see FIGS. 4 and 5), and a lower cutout 5.

With reference to FIGS. 7 to 13, the upper cutout 2 is produced by milling, as follows:

It is apparent that this is a rectangular or square cutout having four corners 6 to 9 which are internal corners.

Figure 7:
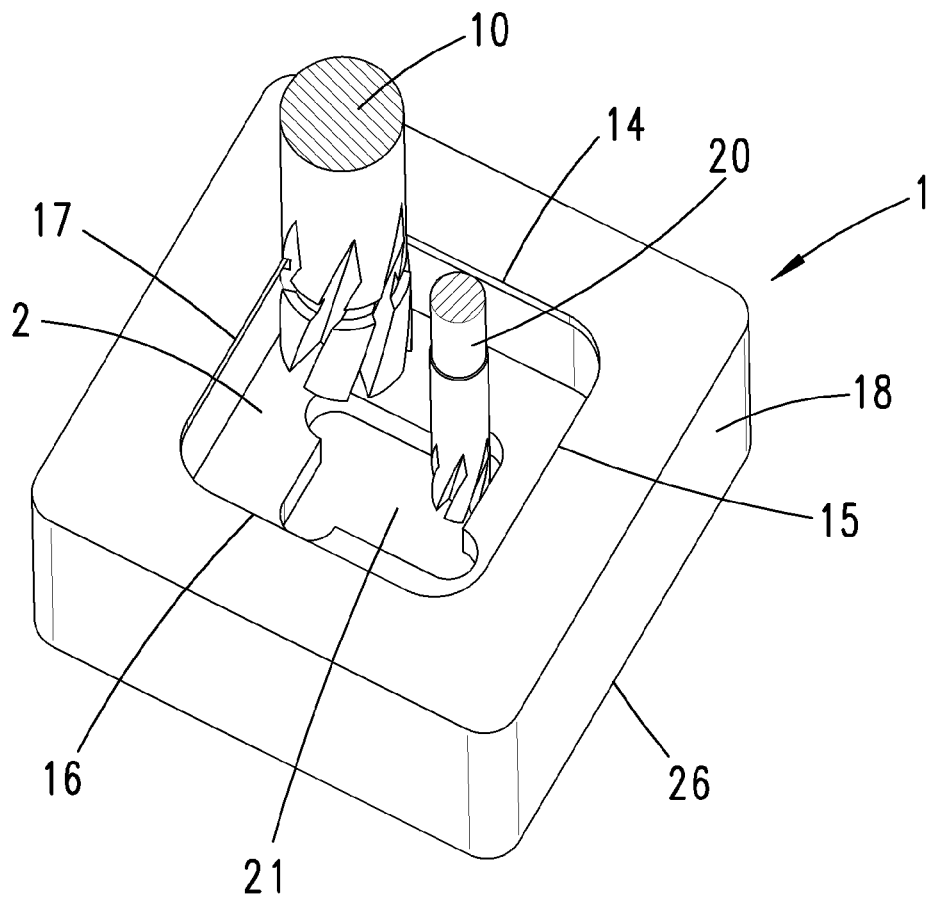
FIG. 7 shows a first illustration for explaining the production of the cutout in the workpiece according to FIG. 1 by milling.
Figure 10:
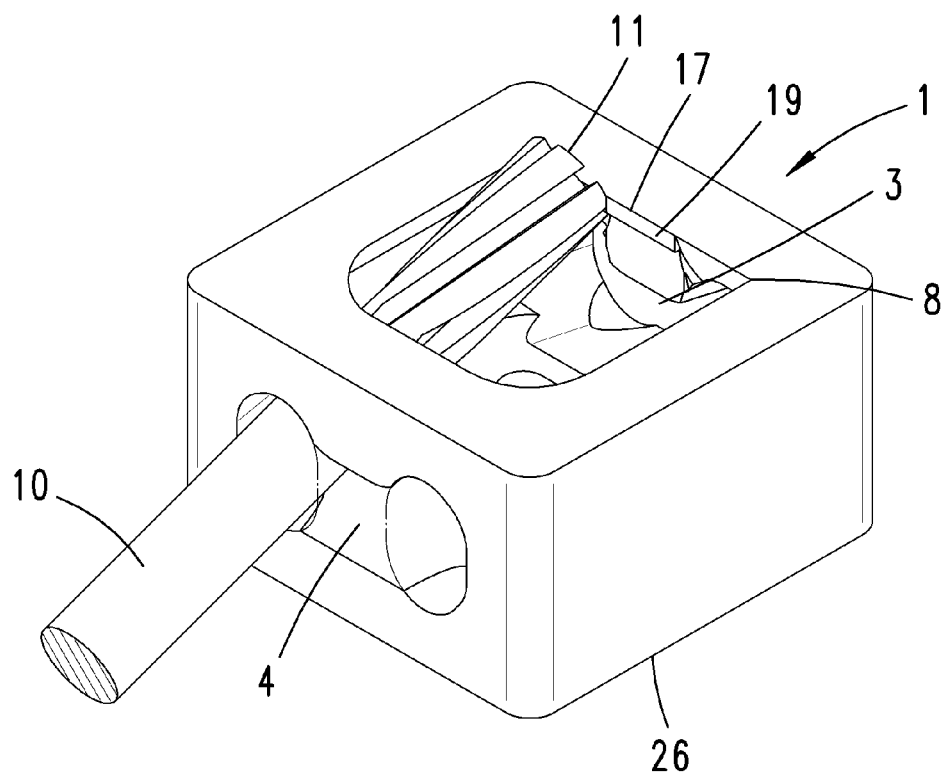
FIG. 10 shows an illustration of the forming of the corner of a cutout in the item according to FIG. 1.

The cutout 2 having the corners 6 to 9 in the configuration according to FIG. 7 is produced initially by the milling cutter 10, which in the customary rotary milling motion generates a cylindrical enveloping surface, by lowering the milling cutter 10 into the workpiece 1 and moving the milling cutter 10, relative to a midpoint of a circle of the enveloping surface defined in cross-section, along the outside of the dashed line L in FIG. 8.

In the exemplary embodiment, the milling cutter 10 has a circumferential groove-like setback 12 which is offset from a front side 11 (also see FIG. 9) toward the clamping point (not illustrated) of the milling cutter. The lateral face created by the milling cutter 10 during rotation thus has a deviation from a cylindrical surface in this region. Also, apart from that, the lateral face does not have to be a cylindrical surface, and may be a conical or cone-shaped surface, for example.

The groove-like setback 12 is used to produce a projection 13 whose inner edge forms the peripheral edges 14 to 17 of the cutout 2 in the exemplary embodiment. Such a projection, and the adjoining widening of a cutout 2 of this kind thus provided in the depth direction, is advantageous, for example with regard to a die which is described herein as an exemplary embodiment, since a punched piece (also see the description below in conjunction with FIGS. 15 to 17) becomes free from the wall of the cutout when it is pressed further down, and is not able to jam or tilt. In this respect, the bevel 19, described in greater detail below, is also advantageous.

After the cutout 2 has been produced in this configuration using the milling cutter 10, as is also apparent from FIG. 8, for example, the milling cutter 10, which in this case, however, may also be a second milling cutter, is further used to mill a window 3 from a lateral surface 18. In the exemplary embodiment, two oppositely situated windows 3, 4 are formed, starting from two opposite lateral surfaces.

The milling cutter 10 is advanced through the window 3 in an orientation of a longitudinal axis A of the milling cutter 10 at an acute angle with respect to an opening plane of the cutout 2 and/or with inclusion of an acute or obtuse angle alpha (also see FIG. 12) with respect to the previous orientation of the milling cutter for forming the cutout 2 (see FIG. 8), until the front side 11 abuts against the peripheral edge 17, and the milling cutter 10 is moved in such a way that the end face of the enveloping surface formed by the front side 11 is aligned with the peripheral edge 17, and the desired corner shape is achieved. The orientation means that a straight line lying in the end face, transversely with respect to the longitudinal axis of the milling cutter, is in alignment with the peripheral edge. Since the end face preferably extends, in a manner of speaking, in contact with the peripheral edge, this may be a straight line which coincides with the peripheral edge.

It is apparent that the milling cutter 10 may be moved in each case through the mentioned two windows 3 and 4 far enough that the two corners 6, 8 may be milled through the one window 4, and the two other corners 9, 7 may be milled through the other window 3.

Due to the oblique orientation of the milling cutter 10 with respect to an opening plane of the cutout 2, a corresponding bevel (for example, the bevel 19 at the peripheral edge 17, as in FIG. 12) results when the described corner is formed with the end face of the cylindrical enveloping surface at the peripheral edge against which the milling cutter runs against with its free end. When the milling cutter moves from below, for example through the described window in the workpiece 1, this results in the bevel, in the sense of a widening in the depth direction T, of the cutout 2 (also see FIG. 9). However, for example when a closed cutout is not involved, the milling cutter may also move with an orientation perpendicular to the depth direction of the cutout 2, or, as described above, with a corresponding oblique orientation from the outside at the top. As is apparent, opposite chamfers may thus also be created at the peripheral edge, or, in the mentioned case in which no closed peripheral edge is present, a peripheral edge formed parallel to the depth direction of the cutout may also be created.

Thus, a cutout 2 is formed in the upper surface 19 of the workpiece 1 by milling, the cutout having sharp-angled (in the exemplary embodiment, right-angled) corners 6 to 9 which are internal corners. The corners are sharp-edged, the actual geometry of the internal corners corresponding to the actual geometry of the external corner shape between the end face and the lateral face of an enveloping surface of this kind of a milling cutter. In this case, it is relevant in practice for a transition to have, for example, a radius of 2 mm or less, down to 0.1 mm, for example, or even smaller.

With regard to the cutout 5, once again with initial reference to FIG. 7, a milling cutter 20, which in principle may also be identical to the milling cutter 10, but which in the exemplary embodiment is clearly a milling cutter having a smaller diameter, engages through the cutout 2 to mill a first cutaway area 21. The cutaway area 21 (see movement depth T1 of the milling cutter 20 in FIG. 9 in the relevant base region of the workpiece) does not yet pass through, i.e., does not yet form a through opening. It is apparent that the arrangement of the cutout 5 beneath the cutout 2 is a distinctive feature of the exemplary embodiment. The upper cutout 2 could also be produced as has been described herein for the cutout 5. In addition, only one cutout 2 or 5 which is produced in this manner could be provided.

As is also apparent from FIG. 8 (see line of travel 1), it is preferred that the milling cutter 20 over-runs the corner region, along one of the peripheral edges, at each of the four corner regions 22 to 25 to be formed. In particular, it is preferably provided that the milling cutter 20 travels over the particular corner region in the direction of the peripheral edge along which the milling cutter 20 is moved toward the particular corner region.

Figure 14:
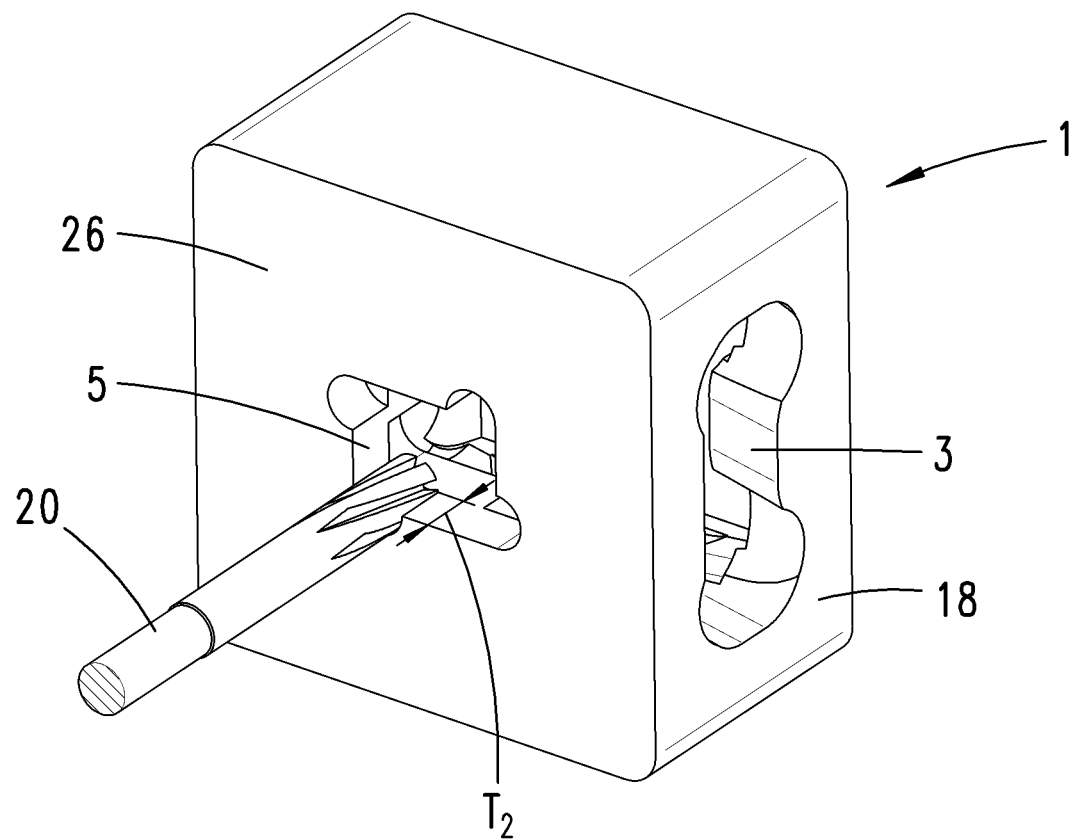
FIG. 14 shows a view, obliquely from below, of the item according to FIG. 1 in the course of further milling out of the lower cutout.

As is further apparent from FIG. 14, after the cutaway area 21 has been milled, the milling cutter 20 is cut into and moved into the workpiece in the same way in the opposite orientation of the milling cutter, starting from the underside 26 of the workpiece 1. However, this is carried out with a depth T2 such that, from the surface of the underside 26 to the tip of the milling cutter (in the exemplary embodiment, the front side 11 of the milling cutter 20), the sum of the previously provided first depth T1 and the depth T2 is greater than the thickness D of the workpiece in the region of the lower cutout 5. In the regions 27 of over-run of the corner regions 22 to 25, the milling cutter 20 over-runs only once in its respective orientation, so that no through opening results in this region of over-run. The depth of an over-run region, measured in the direction of travel of the milling cutter 20, preferably corresponds at least to a radius of the circle generated by the enveloping surface in this region.

Figure 6:
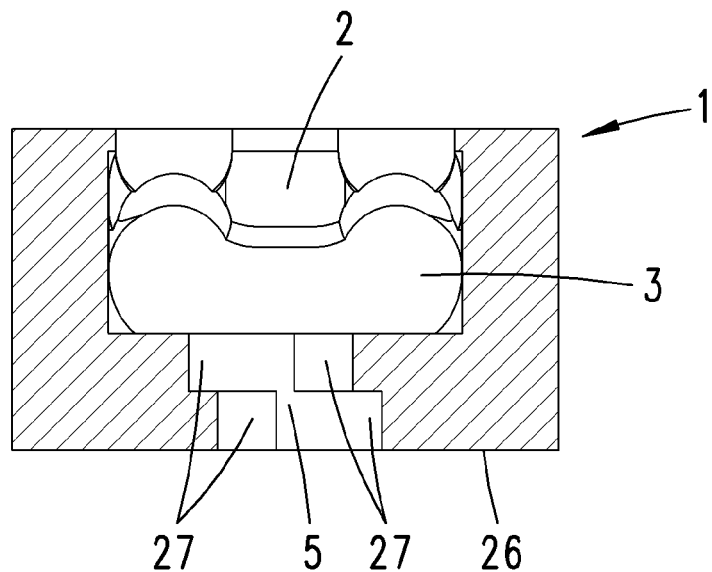
FIG. 6 shows a cross-section through the item according to FIG. 1 and FIG. 2, sectioned along the line VI-IV in FIG. 2.

The described procedure results in a sharp-edged inner contour of the lower cutout 5 also in the corner regions in projection, as is apparent from FIGS. 2 and 6, for example. In the exemplary embodiment, in the corner regions, substantially 90° angles are achieved between the peripheral edges 28 to 31 of this lower cutout 5. As is apparent from FIG. 4, for example, a wall may be created between the corner regions, i.e., outside the over-run regions 27, which extends in a straight line in the depth direction T of the cutout 5, and in the present case, parallel to the depth direction T.

Figure 11:
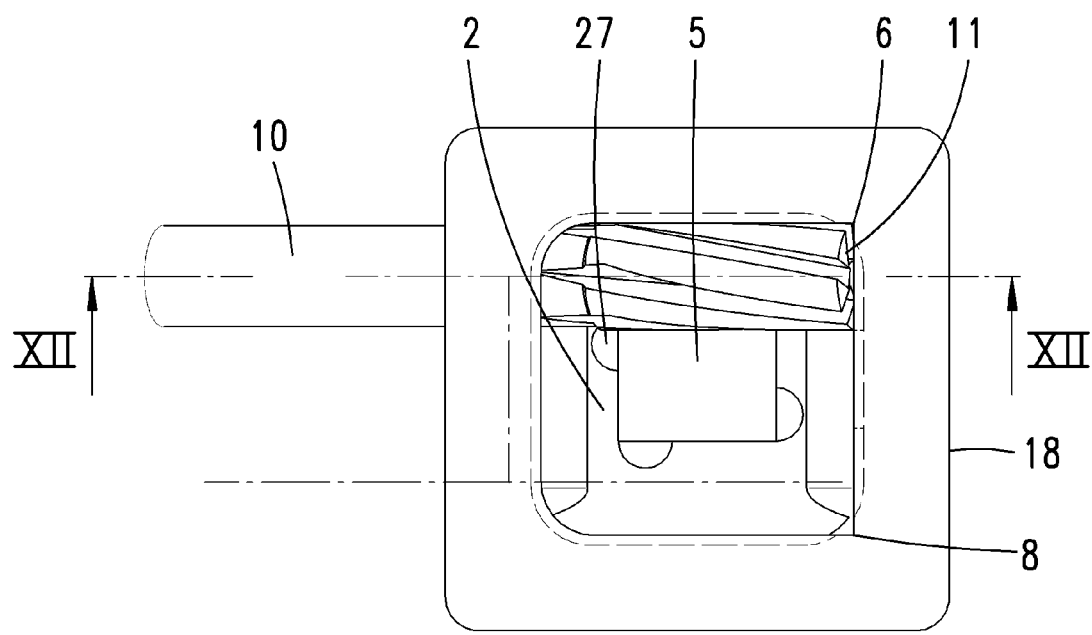
FIG. 11 shows a top view of the arrangement according to FIG. 10.
Figure 12:
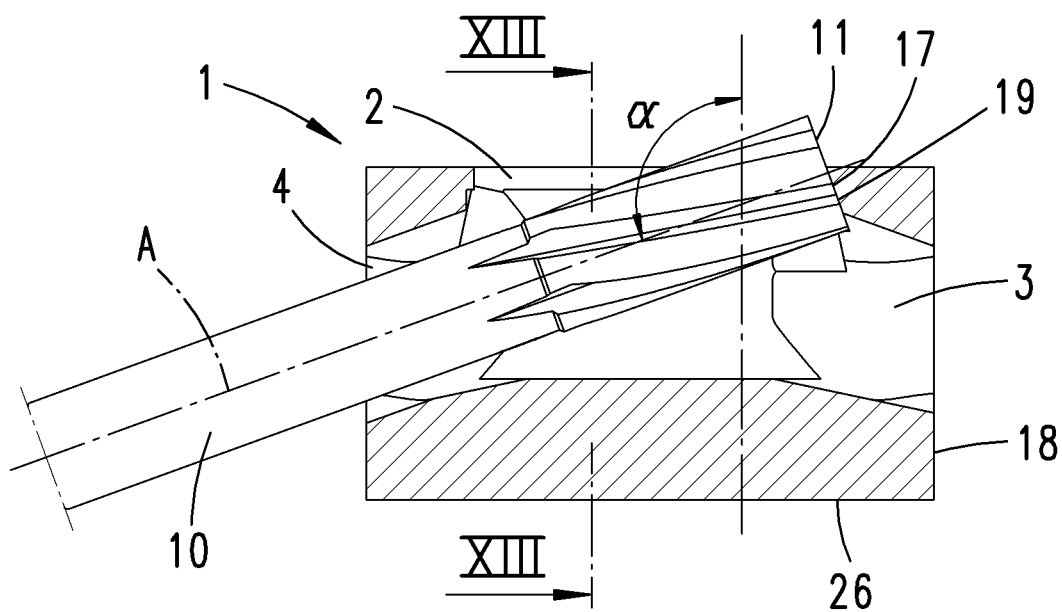
FIG. 12 shows a cross-section through the arrangement according to FIG. 11, sectioned along the line XII-XII.
Figure 12A:
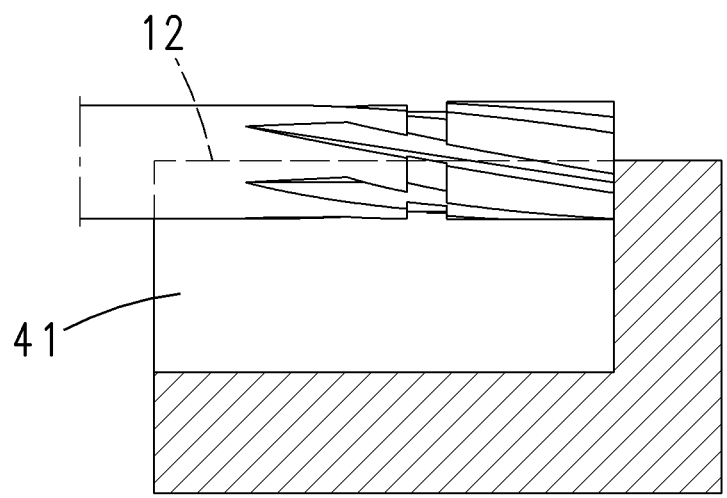

A modification of the configuration according to FIGS. 11 and 12 is explained with reference to FIGS. 11a and 12a. The cutout 2 has a U shape in plan view, having surrounding peripheral edges 12, 13, 14 which are not closed with respect to a top view. An opening results opposite from the peripheral edge 13, through which the milling cutter 10 may move with an orientation parallel to a plane containing the mentioned peripheral edges, in one case by way of example when, as preferred, the mentioned peripheral edges are provided extending in one plane. However, it is also possible, for example, to provide that only two of the peripheral edges extend in one plane. The distinctive feature of this configuration may also be described in that the milling cutter is able to move with a longitudinal axis transverse to a depth direction of the cutout (see the arrow T in FIG. 9, for example) for forming the corner.

In the top view, viewed in the depth direction T, the cutout may be completely or partially closed by a base region 41. However, the cutout may also be continuous. The use of such a workpiece 1 as a die for punching sheet metal is explained with reference to FIGS. 15 to 17.

A tool 32 is partially illustrated, by means of which a tie bolt 33 may be hydraulically moved. For further details concerning this tool, reference is also made to the disclosure content of German Utility Model application 202010008228, not pre-published, which is hereby included in full in the disclosure of the present application, including for the purpose of incorporating features of this earlier application in claims of the present application.

The tie bolt 33 has a substantially rectangular cross-section in its lower region which fits into the cutout 5 in the workpiece 1 and passes through same. The upper cutout 2 is clearly much larger than the mentioned lower cutout 5, and the tie bolt 33 also passes through the upper cutout. Here, the tie bolt 33 does not abut against the peripheral edges. The tie bolt 33 also passes through a previously produced, for example drilled, circular hole 34 in a metal sheet 35 to be punched. A punch 36 is attached to the tie bolt 33 on the top side of the metal sheet 35, on the underside of which the workpiece 1 is situated. The punch 36 likewise has a rectangular cross-section, but has a prismatic configuration on its side facing the metal sheet 35 to allow advantageous punching.

As is apparent from FIG. 16, the punch 36 is secured by a retaining nut 37 onto the tie bolt 33, which has a thread 38 in this region. The retaining nut 37 may in particular be designed as described in German Patent application 102010036482, not pre-published. The disclosure content of this patent application is hereby also included in full in the disclosure of the present application, including for the purpose of incorporating features of the earlier application in claims of the present application.

The tie bolt 33 is then moved by the tool 32 in the direction R in FIG. 17, so that the punch 36 creates a rectangular opening 39 in the metal sheet 35. After the retaining nut 37 has been loosened and the punch 36 removed from the tie bolt 33, the punched piece 40 thus formed may be removed from the workpiece 1, which likewise is removed from the tie bolt, through a window 3 or 4, or may fall out.

All features disclosed are (in themselves) pertinent to the invention. The disclosure content of the associated/accompanying priority documents (copy of the prior application) is also hereby included in full in the disclosure of the application, including for the purpose of incorporating features of these documents in claims of the present application. The subsidiary claims in their optional subordinated formulation characterize independent inventive refinement of the prior art, in particular to undertake divisional applications based on these claims.

| List of reference numerals | |
|---|---|
| 1 | Workpiece |
| 2 | Cutout |
| 3 | Window |
| 4 | Window |
| 5 | Cutout |
| 6 | Corner |
| 7 | Corner |
| 8 | Corner |
| 9 | Corner |
| 10 | Milling cutter |
| 11 | Front side |
| 12 | Setback |
| 13 | Projection |
| 14 | Peripheral edge |
| 15 | Peripheral edge |
| 16 | Peripheral edge |
| 17 | Peripheral edge |
| 18 | Lateral surface |
| 19 | Bevel |
| 20 | Milling cutter |
| 21 | Cutaway area |
| 22 | Corner region |
| 23 | Corner region |
| 24 | Corner region |
| 25 | Corner region |
| 26 | Underside |
| 27 | Over-run regions |
| 28 | Peripheral edge |
| 29 | Peripheral edge |
| 30 | Peripheral edge |
| 31 | Peripheral edge |
| 32 | Tool |
| 33 | Tie bolt |
| 34 | Hole |
| 35 | Sheet metal |
| 36 | Punch |
| 37 | Retaining nut |
| 38 | Thread |
| 39 | Opening |
| 40 | Punched piece |
| A | Longitudinal axis |
| D | Thickness |
| L | Line |
| l | Line of travel |
| T | Depth direction |
| T1 | Depth |
| T2 | Depth |
| alpha | Angle |
| R | Direction |

The invention claimed is:

1. A method for milling a cutout comprising:
providing a workpiece having first and second opposite sides, and a body extending between the opposite sides;
providing a milling cutter having a longitudinal axis, an enveloping cylindrical surface and a front surface forming an enveloping axial surface;
positioning the longitudinal axis of the milling cutter in a first orientation relative to the workpiece such that the milling cutter contacts the first side of the workpiece;
using the enveloping cylindrical surface of the milling cutter when positioned in the first orientation to cut a cutout in the body of the workpiece, the cutout having a plurality of peripheral edges and rounded corners joining adjacent peripheral edges together, wherein the longitudinal axis of the milling cutter is parallel to the peripheral edges in the first orientation;
positioning the longitudinal axis of the milling cutter in a second orientation, the second orientation being angled relative to the first orientation; and
using the enveloping cylindrical surface and the enveloping axial surface of the milling cutter when positioned in the second orientation to further cut the rounded corners of the cutout to form sharp corners.

2. The method of claim 1, wherein a die is formed by said method.

3. The method of claim 1, wherein said second orientation is transverse to said first orientation.

4. The method of claim 1, wherein said second orientation is substantially transverse to said first orientation.

5. The method of claim 1, wherein said milling cutter includes a groove, and wherein when the cutout is cut by said milling cutter, said groove on said milling cutter forms a projection in said peripheral edges of the first cutout.

6. The method of claim 5, wherein said milling cutter forms a bevel on said peripheral edges of said cutout when said milling cutter is in said second orientation.

7. The method of claim 6, wherein a die is formed by said method.

8. The method of claim 1, wherein said milling cutter forms a bevel on said peripheral edges of said cutout when said milling cutter is in said second orientation.

9. The method of claim 8, wherein a die is formed by said method.

10. The method of claim 1, further including cutting a window through said body, said window being in communication with said cutout, and said milling cutter is inserted through said window in said second orientation.

11. The method of claim 10, further including cutting a second window through said body, said second window being in communication with said cutout, and said milling cutter is further inserted through said second window in said second orientation to further cut the corners of said cutout.

12. The method of claim 11, wherein a die is formed by said method.

13. The method of claim 1, wherein said cutout is a first cutout having a depth which is less than a thickness of said workpiece; and further comprising:

using said milling cutter to form a second cutout in said workpiece by entering the workpiece from said second side of said workpiece, said second cutout having peripheral sides having a first depth and corners joining said peripheral sides together, said second depth being less than the thickness of said workpiece; and wherein portions of said first cutout and said second cutout overlap each other along the thickness of said workpiece.

14. The method of claim 13, wherein a die is formed by said method.

15. The method of claim 13, wherein when said first cutout is formed, said milling cutter forms first over-run areas which extend past said corners of said first cutout.

16. The method of claim 15, wherein when said second cutout is formed, said milling cutter forms second over-run areas which extend past said corners of said second cutout, said second over-run areas do not align with said first over-run areas.

17. The method of claim 1, wherein each sharp corner has a deviation from a geometric sharp edge of less than two millimeters.

18. The method of claim 1, wherein each sharp corner forms a right angle.

* * * * *

UNITED STATES PATENT AND TRADEMARK OFFICE
CERTIFICATE OF CORRECTION

| | | |
|---|---|---|
| PATENT NO. | : 9,561,535 B2 | Page 1 of 1 |
| APPLICATION NO. | : 13/880307 | |
| DATED | : February 7, 2017 | |
| INVENTOR(S) | : Egbert Frenken | |

It is certified that error appears in the above-identified patent and that said Letters Patent is hereby corrected as shown below:

On the Title Page

Item (30), under "Foreign Application Priority Data:", in Column 1, delete "10 2010 061 321" and insert -- 10 2010 061 321.5 --.

Signed and Sealed this
Eighteenth Day of April, 2017

Michelle K. Lee
*Director of the United States Patent and Trademark Office*